March 2, 1971 — R. B. NOCKLEBY — 3,566,721
GRIPPING TOOL

Filed Jan. 13, 1969 — 2 Sheets-Sheet 1

INVENTOR.
RAYMOND B. NOCKLEBY
BY Wells & St. John
ATTYS.

March 2, 1971 R. B. NOCKLEBY 3,566,721
GRIPPING TOOL
Filed Jan. 13, 1969 2 Sheets-Sheet 2
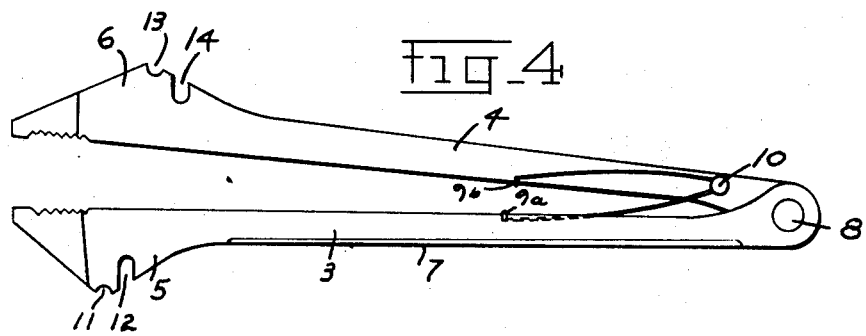
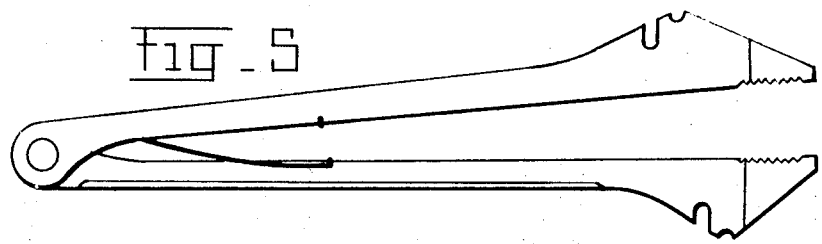
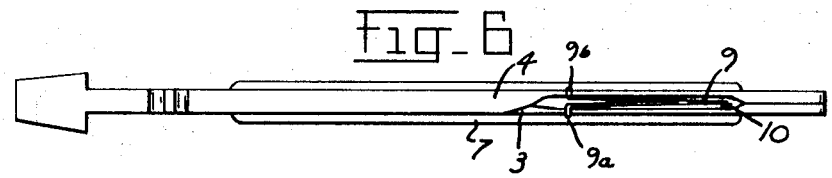
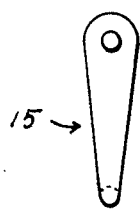 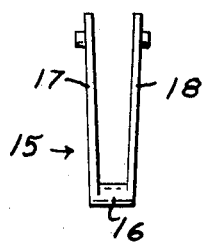 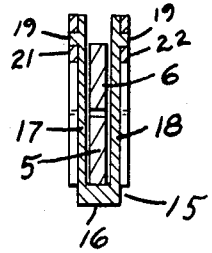 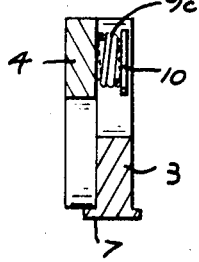
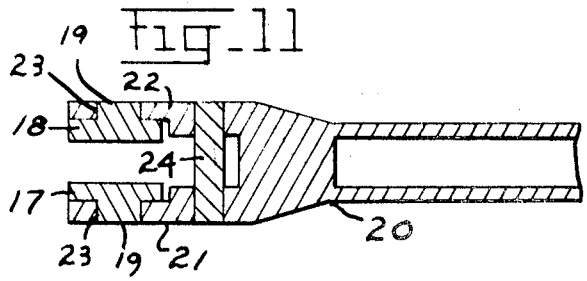
INVENTOR.
RAYMOND B. NOCKLEBY
BY *Wells & St John*
ATTYS.

United States Patent Office 3,566,721
Patented Mar. 2, 1971

3,566,721
GRIPPING TOOL
Raymond B. Nockleby, Rte. 1, Kalispell, Mont. 59901
Filed Jan. 13, 1969, Ser. No. 790,564
Int. Cl. B25b 7/04
U.S. Cl. 81—384                                          3 Claims

ABSTRACT OF THE DISCLOSURE

A gripping tool has two jaw members formed with extended arms which overlap and are pivoted together at their ends remote from the jaw members. One of the areas has a post thereon near the pivotal connection of the arms. A spring is helically wrapped around the post and has its ends extending along the arms toward the jaw members and hooked over the arms to urge them apart. Each arm has widened tapered portions adjacent to the jaw members and provided with a plurality of seats in the outer edges. A yoke receives the tapered portions with its base seated in one of the seats in one portion and its sides being extended across both portions. A jaw closing lever is bifurcated to receive the free ends of the yoke and pivot lugs and sockets on the yoke and bifurcations pivot the yoke to the bifurcations. The lever carries a pivot pin which seats in the seats of one tapered portion when the base of the yoke seats in a seat of the other tapered portion.

BACKGROUND OF THE INVENTION

There are many prior patents upon gripping tools employing jaw members with lever arm extensions and a third jaw closing lever. The closest prior devices known to the applicant are shown in the U.S. Pat. No. 2,749,787 and No. 2,822,715.

THE INVENTION

My invention lies in the combination with the jaw members and their lever arms of the yoke and bifurcated jaw closing lever wherein the lever arms are tapered to greater width immediately adjacent to the jaw members and these tapered portions are notched in their outer edges to receive pivot means at the base of the yoke and between the bifurcations. Thus the spread of the jaw members to receive and grip articles of varying sizes is adjustable by shifting the yoke and bifurcated lever to seat their pivot means in different notches along the tapered portions of the lever arms.

More specifically, it is the purpose of my invention to so combine the yoke and bifurcated jaw closing lever with the tapered portions of the lever arms as to provide a flat gripping tool which can be inserted in difficult places and in which the yoke and the bifurcated lever are not fastened to the gripping jaws or their lever arms.

GENERAL DESCRIPTION

The preferred form of my invention is disclosed in the accompanying drawings, wherein:

FIG. 4 is a side view of the gripping jaws and their arms with the yoke and jaw closing lever removed;

FIG. 5 is a side view showing the other side faces of the gripping jaws and their arms;

FIG. 6 is a plan view looking down on FIG. 4;

FIGS. 7 and 8 are side views of the yoke taken at right angles to each other;

FIG. 9 is a sectional view on the line 9—9 of FIG. 2;

FIG. 10 is an enlarged sectional view on the line 10—10 of FIG 2; and

FIG. 11 is an enlarged sectional view on the line 11—11 of FIG. 2.

DESCRIPTION OF THE PREFERRED EMBODIMENT

Figure 1:
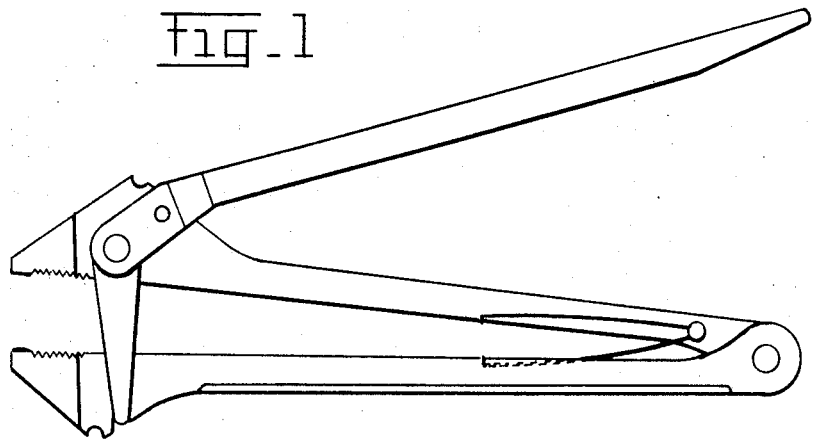
FIG. 1 is a side view of the gripping tool with its gripping jaws in open position.
Figure 2:
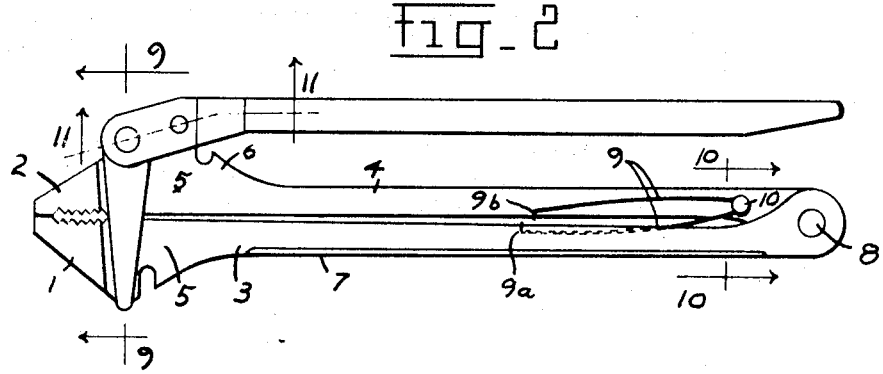
FIG. 2 is a side view showing the gripping tool in closed position.
Figure 3:
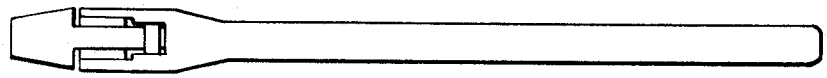
FIG. 3 is a top view looking down on FIG. 2.

In my gripping tool two gripping jaw members 1 and 2 having serrated faces are provided with extending arms 3 and 4 respectively, the arms being substantially narrower in thickness than the jaw members. The arms have tapered portions 5 and 6 increasing substantially in depth over the depth of either the jaw members 1 and 2 or the arms 3 and 4 but being of the same thickness as the arms. The arm 3 has a gripping flange 7 thereon.

At their ends remote from the jaw members 1 and 2 the arms 3 and 4 overlap and are pivoted together by a pivot pin 8. A spreading spring 9 is wound around a headed stud 10 on the arm 4. It has one end 9a hooked around the inner edge of the arm 4 so that the coils at 9c. (FIG. 10) cause the ends 9a and 9b to urge the arms and the jaws apart.

Each of the tapering portions 5 and 6 has two seats cut into it from the outer edge face. The seats 11 and 12 in the outer edge face of the portion 5 are close to the jaw member 1. The seat 11 is shallow and the seat 12 is substantially deeper. Similar seats 13 and 14 are substantially farther from the jaw member 2 than the seats 11 and 12 are from the jaw member 1. These seats are for the purpose of receiving a linkage composed of a yoke 15 and bifurcations 21 and 22 on a lever 20. The yoke has a base 16 with arms 17 and 18 each with a pivot lug 19 thereon near its free end. The bifurcations 21 and 22 have sockets 23 therein to receive the lug 19 and a pivot pin 24 to seat the seats 13 and 14. The arms 17 and 18 diverge from the base 16 and the yoke is resilient so it can be closed enough to fit the lugs 19 into the sockets 23. This resilience causes the yoke arms and the bifurcations to exert sufficient frictional contact so that the lever 20 and the yoke 15 resist any change in the angle they make with each other.

In this tool the lever 20 is entirely free of any permanent connect to the jaw members and their arms. This allows a substantial adjustment of maximum opening of the jaw members with a uniform design of the gripping bead. There is nothing protruding from the sides of the tool which is a considerable advantage in use of the tool in tight working quarters. Only two seats have been shown in each of the portions 5 and 6. More can be provided if needed.

It is believed that the nature and advantages of my invention will be clear from the foregoing description. Having described my invention, I claim:

1. A gripping tool comprising:
    two opposed jaw members having arms integral therewith of substantially less thickness than the jaws and pivoted together;
    said arms having tapered portions adjacent the jaw members with their outer edge faces diverging toward the jaws and recessed along the diverging faces to provide seats;

a yoke receiving the tapered portions between its arms and having a base received in one of the seats of one arm;

a lever having bifurcations at one end receiving the free ends of said yoke and pivoted thereon;

said lever having a pivot pin received in one of the seats of the other arm; and spring means connected to said arms on the jaw members urging them apart.

2. The tool defined in claim 1 wherein the seats engaged by the pivot pin are spaced farther from the adjacent jaw member than the seats engaged by the yoke base are from the jaw member adjacent to them.

3. The tool defined in claim 1 wherein the yoke arms press outwardly against the bifurcations to frictionally resist angular movement of the lever with respect to the yoke.

References Cited

UNITED STATES PATENTS

| | | | |
|---|---|---|---|
| 1,380,232 | 5/1921 | Metcalf | 81—43 |
| 2,822,715 | 2/1958 | Raimondi | 81—330 |
| 639,812 | 12/1899 | Jensen | 81—384 |

ROBERT C. RIORDON, Primary Examiner

R. V. PARKER, Jr., Assistant Examiner